(12) United States Patent
Garner

(10) Patent No.: US 8,890,007 B2
(45) Date of Patent: Nov. 18, 2014

(54) GAMBREL WITH LOST MOTION WEIGHING SCALE

(76) Inventor: Glenn A. Garner, Pine Mountain, GA (US)

( * ) Notice: Subject to any disclaimer, the term of this patent is extended or adjusted under 35 U.S.C. 154(b) by 286 days.

(21) Appl. No.: 13/356,152

(22) Filed: Jan. 23, 2012

(65) Prior Publication Data

US 2012/0199404 A1 Aug. 9, 2012

Related U.S. Application Data

(63) Continuation-in-part of application No. 13/023,749, filed on Feb. 9, 2011, now Pat. No. 8,592,696.

(51) Int. Cl.
| | |
|---|---|
| *G01G 19/52* | (2006.01) |
| *A22B 1/00* | (2006.01) |
| *G01G 19/18* | (2006.01) |
| *A22B 7/00* | (2006.01) |
| *A22B 5/00* | (2006.01) |
| *G01G 21/22* | (2006.01) |
| G01G 19/06 | (2006.01) |

(52) U.S. Cl.
CPC .............. *A22B 7/002* (2013.01); *G01G 19/18* (2013.01); *G01G 19/06* (2013.01); *A22B 5/0064* (2013.01); *G01G 21/22* (2013.01)

USPC ............................ 177/126; 177/245; 452/189

(58) Field of Classification Search
USPC ........... 177/126, 127, 245; 452/189, 191, 192
See application file for complete search history.

(56) References Cited

U.S. PATENT DOCUMENTS

| 502,786 | A | * | 8/1893 | Storey | 177/126 |
|---|---|---|---|---|---|
| 973,771 | A | * | 10/1910 | Geary | 177/147 |
| 1,813,600 | A | | 7/1931 | Aubol | |
| 2,256,123 | A | | 9/1941 | Medigovich | |
| 2,940,746 | A | * | 6/1960 | Anderson et al. | 177/146 |
| 3,395,768 | A | | 8/1968 | Benbow | |
| 6,264,544 | B1 | | 7/2001 | Mullins | |
| 8,592,696 | B2 | * | 11/2013 | Garner et al. | 177/126 |

OTHER PUBLICATIONS

"DutchCraft Truss and Metal Inc.: Truss Design", Dec. 19, 2013.*
"Harvest Essentials: Heavy Duty Gambrel", Dec. 19, 2013.*

* cited by examiner

*Primary Examiner* — Randy W Gibson
(74) *Attorney, Agent, or Firm* — Thomas|Horstemeyer, LLP

(57) ABSTRACT

A lost motion connector 44 extends between a weighing scale 28 and the apex 18 of a gambrel so that the weighing scale is not subjected to excessive surges of weights and forces that may be applied to the gambrel during the mounting of the wild game to the gambrel for the purpose of weighing the wild game.

12 Claims, 2 Drawing Sheets

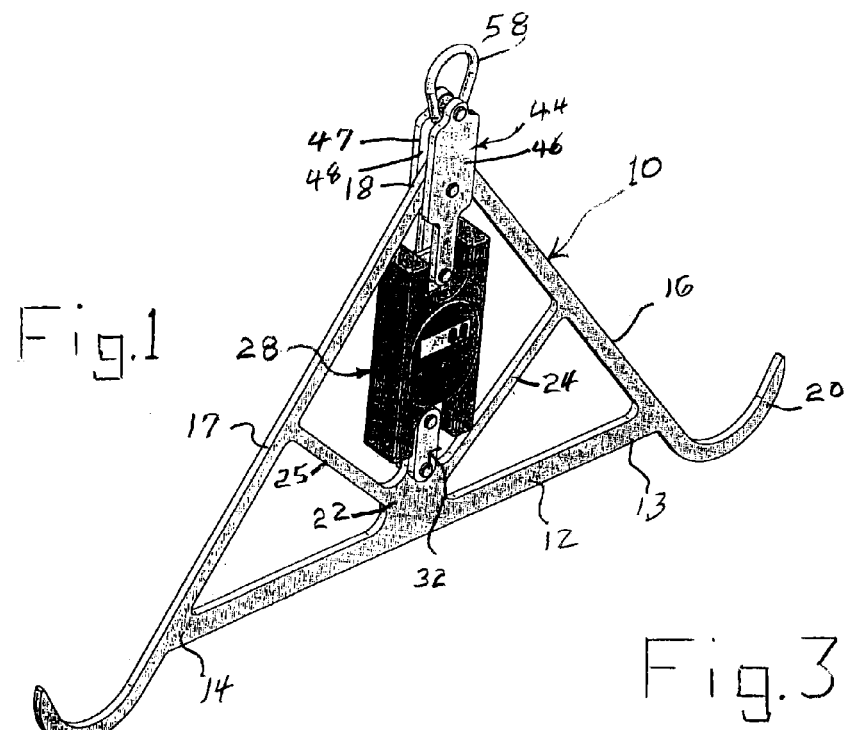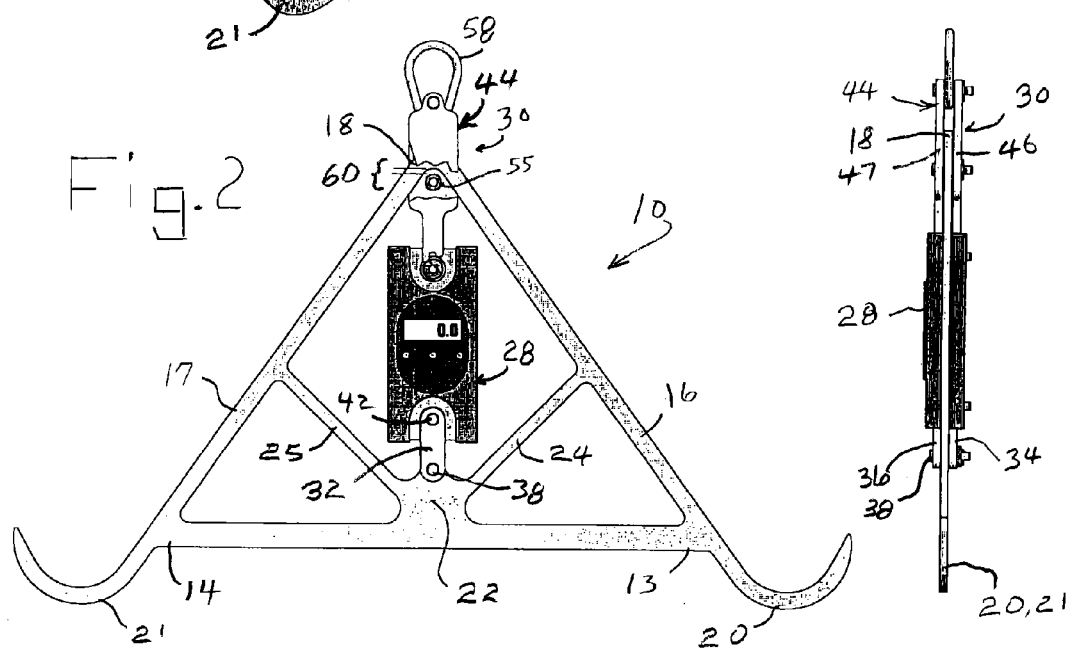

GAMBREL WITH LOST MOTION WEIGHING SCALE

CROSS-REFERENCE

This is a continuation-in-part of U.S. patent application Ser. No. 13/023,749, filed Feb. 9, 2011.

FIELD OF THE INVENTION

This disclosure concerns carcass gambrels used for dressing wild game such as deer, hog, and other large game, and for weighing the wild game while it remains hung from the gambrel, before and/or after the dressing process.

BACKGROUND OF THE DISCLOSURE

Once a wild animal has been taken, hunters usually desire to weigh and dress the carcass in the field as opposed to transporting the carcass to a storage facility where the carcass may be dressed and weighed at a later time. In general, there are problems with expedient dressing and weighing of game in the field. For example, it is desirable to avoid contact of the carcass with the ground during the dressing process since it is difficult to reach all surfaces of a carcass lying on the ground, and it is desirable to avoid contamination of the carcass meat by engaging the ground.

To avoid having the carcass engage the ground during the dressing procedure, game hangers, sometimes known as "gambrels", have been used that comprise hooks or other connection devices that grasp the carcass and a rope is used to lift the connection device so as to suspend the carcass above the ground for harvesting the carcass.

Further, it is desirable to weigh the game carcass in the field, before and/or after dressing the carcass.

Once the game carcass has been elevated for field dressing and it is desirable to weigh the carcass, the hunter is likely to want to weigh the carcass twice, once to obtain the total weight of the fully intact game carcass as killed in the wild, and then again after the game carcass has been properly dressed. The hunter is likely to have to lower the carcass from the hanger between the weighing and dressing procedures to connect and disconnect a scale to the game hanger, requiring multiple lifts of the carcass. In the situation where heavy carcasses are to be dressed and weighed, this becomes an onerous and undesirable activity.

Gambrels for game carcasses have been developed for suspending the carcasses above ground for dressing and also for weighing the carcasses. Such carcass gambrels and weighing devices are disclosed in U.S. Pat. Nos. 2,256,123, 3,395,786 and 6,264,544.

Some of the prior art carcass hangers and weighing devices incorporate a scale with the connecting hooks used to lift the carcass, so that the lifting and weighing of the carcass are performed simultaneously. As the carcass is lifted, the scale begins its weighing function. While it is desirable to have the scale weigh the carcass, it would be desirable to limit the weight applied to the scale during the lifting and handling of the carcass, so as to avoid applying too much weight to the scale.

Thus, there is a need to provide an improved carcass gambrel that can provide a means for lifting the carcass for the purpose of dressing the carcass, and a weighing scale for the purpose of weighing the carcass before and after dressing, with the gambrel and weighing scale configured to limit the amount of weight that can be applied to the weighing scale, and with the gambrel being of a convenient size and structure for use in conditions in the field where the hunter has taken the carcass.

SUMMARY OF THE DISCLOSURE

Briefly, this disclosure concerns a carcass hanger, generally known as a gambrel, that may be used for lifting and suspending wild game carcasses, and a weighing scale for weighing the carcasses that have been suspended by the gambrel, before and after dressing, all with a single raising of the carcass. The gambrel may include an upper portion and a lower portion, the weighing scale is positioned between upper portion and lower portion of the gambrel and is connected to the lower portion of the gambrel. A lost motion device, such as a clevis, is connected to the upper portion of the weighing scale and straddles the upper portion of the gambrel. The lost motion device is configured for suspending the gambrel from a support positioned above the gambrel and for limiting the movement of the weighing scale with respect to the gambrel.

The lost motion device may be configured for straddling the upper portion of the gambrel and for suspending the gambrel from a higher support and for limiting the movement of the weighing scale with respect to said gambrel.

The lost motion device is configured as a clevis that holds the gambrel upright when loaded with game and to function as a lost motion connector to the upper portion of the gambrel so that the clevis applies the weight of the game directly to the weighing scale.

When a carcass is to be dressed and weighed in the field, the gambrel with its weighing scale is attached to an overhead support that could be a limb of a tree or a fabricated structure. Hocks or the legs of the carcass are attached to the carcass mounting members of the gambrel. Typically, the gambrel will be suspended from an overhead structure by means of a rope extending over a pulley, with the pulley attached to the overhead structure. The hunter can mount the gambrel to the wild game carcass, then lift the carcass by pulling on the rope that extends over the pulley. Once the rope is tied off, the carcass may be dressed and weighed without having to release the carcass between the dressing and weighing activities.

In one embodiment of the invention, a lost motion connection is formed between the upper portion of the gambrel and the weighing scale. The lost motion connection has a limited motion with respect to the gambrel to avoid applying too much weight to the weighing scale. Once the scale reaches the end of the lost motion connection, no further forces are applied through the gambrel to the weighing scale.

This convenient automatic de-activation of the scale provides the huntsman with the convenience of a single lifting of the carcass for both dressing and weighing, and shielding the scale from undue movements and forces during the lifting of the carcass.

Other objects, features and advantages of this invention will become apparent upon reading the following specification, when taken in conjunction with the accompanying drawings.

BRIEF DESCRIPTION OF THE DRAWINGS

FIG. 1 if a perspective view of the game carcass gambrel and weighing scale.

FIG. 2 is a front view thereof.

FIG. 3 is a side view thereof.

DETAILED DESCRIPTION

Figure 4:
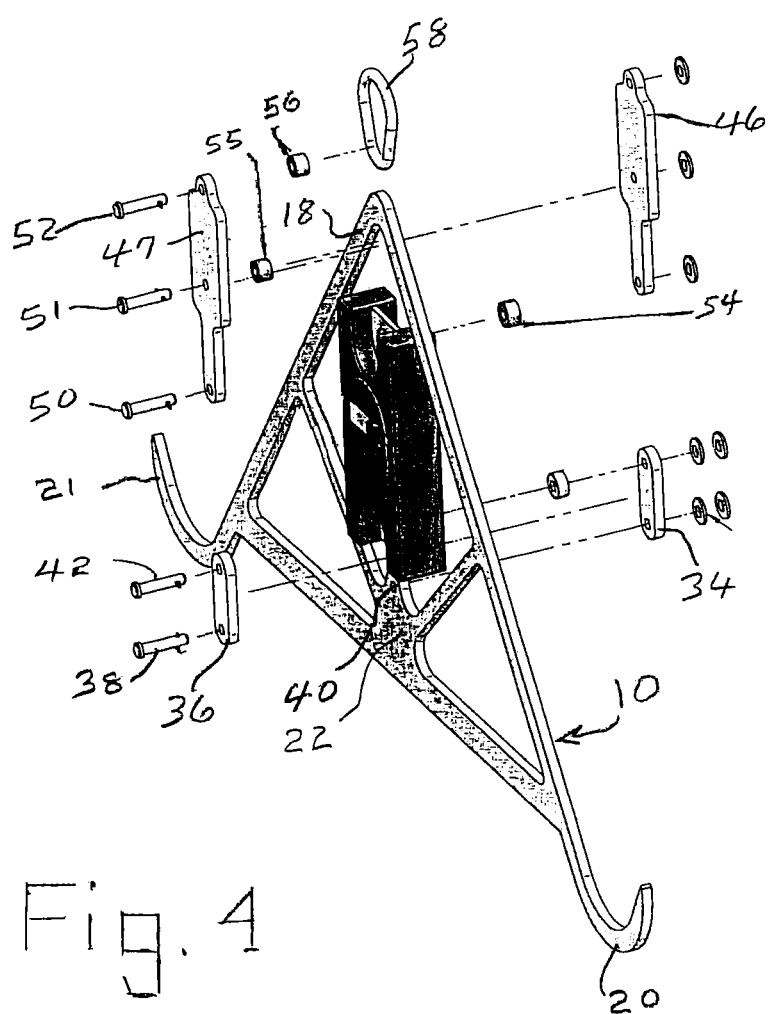
FIG. 4 is an exploded perspective view of the game carcass gambrel and weighing scale, with the clevis and the lower hanger exploded away from the gambrel and weighing scale.

Referring now in more detail to the drawings, in which like numerals indicate like parts throughout the views, FIG. 1 illustrates a game carcass gambrel 10 of the type that is used to suspend wild game in the field, for weighing and dressing of the wild game. The gambrel is formed in a triangular shape including laterally extending lower support bar 12 with opposed ends 13 and 14, a pair of inclined bars 16 and 17, each connected to and sloped upwardly from an opposed end 13 and 14 of the laterally extending lower support bar 12, and converging together at the upper portion of the gambrel to form the apex 18 of the gambrel. This forms the gambrel in a generally triangular shape with game mounting members such as J-shaped hooks 20 and 21 supported at each of the opposed ends of the laterally extending lower support bar 12.

A support web 22 is formed at the central portion of the laterally extending support bar 12, and diagonal support bars 24 and 25 extend from the support web 22 outwardly toward a substantially right angle intersection with the inclined bars 16 and 17, respectively. This helps to rigidify the gambrel.

Weighing scale 28 is positioned within the triangle formed by the components of the gambrel 10, between the support web 22 at the laterally extending support bar 12, which comprise the lower portion of the gambrel. The weighing scale is supported adjacent the apex 18 of the triangularly shaped gambrel by a clevis 30.

A lower hanger 32 is pivotally connected at its ends to support web 22 and at its upper end to the lower end of the weighing scale 28. The upper end of the weighing scale is supported by the upper portion of the triangularly shaped gambrel 10. The lower hanger 32 is formed by a pair of parallel hanger plates 34 and 36 (FIG. 4) that are mounted by a common connector pin 38 that extends through the lower openings of the connector plates and through a weighing scale support opening 40 that is formed in the support web 22, intermediate the ends of the laterally extending lower support bar 12.

Likewise, the upper end portions of the hanger plates 34 and 36 are pivotally connected to the lower end portion of the weighing scale 28 by common connector pin 42 so that the lower portion of the weighing scale is pivotally mounted to the support web 22 in the lower portion of the gambrel 10.

A lost motion connector 44 is mounted to the apex 18 of the triangularly shaped game carcass gambrel 10. The lost motion connector 44 may comprise a clevis that straddles the apex of the gambrel and which suspends the upper portion of the weighing scale 28 beneath the apex 18 and between the pair of inclined bars 16 and 17 of the gambrel. The clevis includes a pair of parallel support plates 46 and 47 that are spaced apart from one another to form a slot 48 therebetween, with the slot fitting about the apex 18 of the gambrel. Connector pins 50, 51 and 52 extend through the support plates 46 and 47. The lower connector pin 50 extends through the lower end portion of both support plates 46 and 47 and also through an opening in the upper portion of the weighing scale 28 so that the support plates 46 and 47 are pivotally mounted to the upper end of the weighing scale 28.

The pin next above, pin 51, extends through the intermediate, aligned openings in the support plates 46 and 47, with the connector pin passing immediately beneath the apex 18 of the triangularly shaped gambrel 10.

Connector pin 52 also extends through the upper aligned openings formed in the support plates 46 and 47. The hanger ring 58 also may be inserted in the slot 48 formed between the support plates 46 and 47, surrounding the upper connector pin 52 and its cylindrical spacer 56, forming a convenient way to hang the gambrel from an overhead support (not shown).

It will be noted that cylindrical spacers 54, 55 and 56 are placed between the support plates 46 and 47, about each of the connector pins 50-52 so that the support plates 46 and 47 do not bind against the apex 18 of the game carcass gambrel 10.

As illustrated in FIG. 4, the lower connector pin 50 and its spacer 54 are displaced downwardly from the apex formed by the pair of inclined bars 16 and 17 of the game carcass gambrel 10. As best shown in FIG. 2, this displacement of the connector pin 51 and its spacer 55 from the apex 18 of the gambrel creates a lost motion between the connector pin 51 and its cylindrical spacer 55, which allows the weight of the carcass hanging from the gambrel 10 to draw the gambrel downwardly through the lost motion space until the apex 18 of the upper portion of the game carcass gambrel 10 comes to rest on connector pin 51 and its cylindrical spacer 55. This causes the weighing scale 28 to support the entire weight of the carcass hanging from the gambrel until the weight of the carcass causes the gambrel to engage the connector pin 51 and its cylindrical spacer 55.

Typically, the amplitude of the lost motion between the apex 18 and the connector pin 51 and its cylindrical spacer 55 is gauged so that the user of the scale will know the maximum weight that can be applied to the gambrel before the lost motion connection maxes out and the gambrel rests on the connector pin and its cylindrical spacer. The length of the lost motion of the lost motion connector 44 may be changed by replacing the cylindrical spacer with another size spacer, thereby changing the maximum weight that might be applied to the gambrel.

The lost motion connector is calibrated so as to avoid inadvertent forces applied to the gambrel from exceeding the maximum weight limit of the scale.

It will be noted that the weight applied to the weighing scale 28 extends from the carcass legs, through the game mounting members 20 and 21 at the opposite ends of the laterally extending support bar 12, upwardly through the support web 22 that is intermediate the ends of the laterally extending support bar 12, through the lower hanger 32, through the weighing scale 28, then through the lost motion connector 44, to the hanger ring 58 of the lost motion connector. Only after the maximum weight has been applied to the gambrel will the apex 18 of the gambrel come to rest on the connector pin 51 and its cylindrical spacer 55. This applies the excess load on the gambrel to bypass the weighing scale 28 by being transmitted from the game mounting members 20, 21 through the pair of inclined bars 16 and 17, to the apex 18 to the lost motion connector 44 and to the hanger ring 58, thereby protecting the weighing scale from bearing excessive weight.

While the support plates 46 and 47 have been specifically described with respect to forming the lost motion connector 44, it is anticipated that other shapes of the lost motion connector may be utilized without departing from the spirit and scope of this invention. Further, the specific mechanical features of the disclosed invention may be modified without departing from the function and plan of the assembled game carcass gambrel and weighing scale.

Although a preferred embodiment of the invention has been disclosed in detail herein, it will be obvious to those skilled in the art that variations and modifications of the disclosed embodiment may be made without departing from the spirit and scope of the invention as set forth in the following claims.

The invention claimed is:

1. A gambrel and weighing scale assembly configured for weighing and harvesting large game comprising
   a gambrel formed in a triangular shape including a laterally extending support bar with opposed ends, a pair of inclined bars each extending upwardly from one of said opposed ends of said laterally extending support bar and converging together to form an apex of said triangular shape,
   game mounting members supported at each said opposed end of said laterally extending support bar,
   said weighing scale positioned in the interior of said triangular shape of said carcass gambrel, said weighing scale including a lower connection adjacent said laterally extending support bar of said gambrel and an upper connection adjacent said apex of said gambrel,
   a lower hanger connecting said lower connection of said weighing scale to said laterally extending support bar of said gambrel,
   an upper hanger connected to said upper connection of said weighing scale, said upper hanger extending about said apex of said gambrel and configured to suspend said weighing scale within said triangular shape of said gambrel and to movably suspend said gambrel at the apex of said gambrel, and
   said upper hanger is configured for limiting the movement of the weighing scale with respect to the gambrel to limit the weight applied to the weighing scale.

2. The gambrel and weighing scale assembly of claim 1, wherein said upper hanger straddles said apex of said gambrel.

3. The gambrel and weighing scale assembly of claim 1, wherein said upper hanger comprises a pair of hanger plates spaced from each other and defining a slot there between, said apex of said gambrel is movably positioned in said slot.

4. The gambrel and weighing scale assembly of claim 3, wherein said upper hanger includes a spacer positioned between said pair of hanger plates and positioned within said apex of said gambrel.

5. The gambrel and weighing scale assembly of claim 1, wherein said upper hanger includes a clevis that straddles said apex of said gambrel.

6. The gambrel and weighing scale assembly of claim 1, wherein said gambrel includes diagonal struts extending between said laterally extending support bar to said pair of inclined bars.

7. The gambrel and weighing scale assembly of claim 1, wherein said weighing scale is movably supported in said gambrel between said diagonal struts.

8. A gambrel and weighing scale assembly comprising,
   a gambrel including an upper portion and a lower portion,
   a weighing scale positioned between said upper portion and said lower portion of said gambrel and connected to said lower portion of said gambrel,
   a lost motion connector connected to said upper portion of said weighing scale and movably connected to said upper portion of said gambrel, said lost motion connector configured for suspending said weighing scale from a support above said gambrel and for limiting the downward movement of said gambrel with respect to said weighing scale.

9. The gambrel and weighing scale assembly of claim 8, wherein said lost motion connector includes a pair of parallel support plates that define an intermediate space that extends about said upper portion of said gambrel.

10. The gambrel and weighing scale assembly of claim 9, wherein said lost motion connector includes a spacer positioned in said intermediate space between said pair of parallel support plates at said upper portion of said gambrel, said spacer configured for maintaining said parallel support plates in spaced relationship for straddling said upper portion of said gambrel.

11. A gambrel and weighing scale assembly configured for weighing and dressing large game carcasses comprising
   a gambrel including an upper portion and a lower portion spaced from each other, carcass mounting members at said lower portion of said gambrel shaped for mounting an animal carcass to said gambrel,
   said weighing scale positioned between said upper portion and said lower portion of said gambrel and including a lower portion and an upper portion, said lower portion of said weighing scale connected to said lower portion of said gambrel, and
   a lost motion hanger moveably supporting the upper portion of said weighing scale about said upper portion of said gambrel and configured for suspending said weighing scale from a higher support.

12. The gambrel and weighing scale assembly of claim 11, wherein said lost motion hanger comprises a pair of parallel support plates that define an intermediate space that extends about said upper portion of said gambrel and that straddles the upper portion of said gambrel.

\* \* \* \* \*